(12) United States Patent
Rangaswami et al.

(10) Patent No.: US 10,073,721 B2
(45) Date of Patent: Sep. 11, 2018

(54) NON-BLOCKING WRITES TO FILE DATA

(71) Applicants: Raju Rangaswami, Miami, FL (US); Daniel Campello, Miami, FL (US); Luis Useche, Miami, FL (US); Hector Lopez, Miami, FL (US); Ricardo Koller, Miami, FL (US)

(72) Inventors: Raju Rangaswami, Miami, FL (US); Daniel Campello, Miami, FL (US); Luis Useche, Miami, FL (US); Hector Lopez, Miami, FL (US); Ricardo Koller, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 14/827,647

(22) Filed: Aug. 17, 2015

(65) Prior Publication Data
US 2016/0055084 A1    Feb. 25, 2016

Related U.S. Application Data

(60) Provisional application No. 62/039,713, filed on Aug. 20, 2014.

(51) Int. Cl.
G06F 9/54    (2006.01)
G06F 17/30   (2006.01)
G06F 3/06    (2006.01)

(52) U.S. Cl.
CPC .............. *G06F 9/545* (2013.01); *G06F 3/06* (2013.01); *G06F 17/30165* (2013.01)

(58) Field of Classification Search
CPC ......... G06F 2212/6042; G06F 12/0815; G06F 12/0891; G06F 2212/602;
(Continued)

(56) References Cited

U.S. PATENT DOCUMENTS 5,968,134 A * 10/1999 Putzolu ............. G06F 17/30067
707/E17.01
2002/0166031 A1* 11/2002 Chen ................... G06F 12/0813
711/141

(Continued)

OTHER PUBLICATIONS

Useche, Luis, Ricardo Koller, and Akshat Verma. "Truly Non-blocking Writes." HotStorage. 2011.*
(Continued)

*Primary Examiner* — Mano Padmanabhan
*Assistant Examiner* — Patrick W Borges
(74) *Attorney, Agent, or Firm* — Saliwanchik, Lloyd & Eisenschenk

(57) ABSTRACT

Techniques and systems are disclosed for implementing non-blocking writes to eliminate the fetch-before-write requirement by creating an in-memory patch for the updated page and unblocking the calling process. Non-blocking writes eliminate such blocking by buffering the written data elsewhere in memory and unblocking the writing process immediately. Subsequent reads to the updated page locations are also made non-blocking and, in some cases, can be eliminated when the read request can be serviced from in-memory patches.

Implementation scenarios can include an operating system (OS) enhancement, revision to an existing OS component (e.g., the OS kernel), special OS component, or enhancement to the software or firmware of the controller software or microcontroller of a storage device or array of storage devices.

20 Claims, 8 Drawing Sheets

(58) Field of Classification Search
CPC ..... G06F 2212/6022; G06F 2212/6024; G06F 2212/6026; G06F 2212/6028; G06F 2216/13; G06F 9/30047; G06F 9/3802
See application file for complete search history.

(56) References Cited

U.S. PATENT DOCUMENTS

| | | | | |
|---|---|---|---|---|
| 2006/0059242 A1* | 3/2006 | Blackmore | ......... | G06F 12/1081 709/211 |
| 2010/0211731 A1* | 8/2010 | Mittendorff | ......... | G06F 12/0866 711/113 |
| 2014/0089528 A1* | 3/2014 | Bloch | ..................... | G06F 12/08 710/4 |

OTHER PUBLICATIONS

Bhattacharya, Suparna et al., "Asynchronous I/O Support in Linux 2.5," *In Proc. of the Ottawa Linux Symposium*, Jul. 2003.

Byan, Steve et al., "Mercury: host-side flash caching for the datacenter," *In Proc. of IEEE MSST*, Apr. 2012.

Daley, R.C. et al., "A General-Purpose File System for Secondary Storage," *In Proceedings of the Fall Joint Computer Conference, Part I, AFIPS '65*, 1965, pp. 213-229.

Elmeleegy, Khaled et al., "Lazy Asynchronous I/O for Event-Driven Servers," *In Proceedings of the 2004 USENIX Annual Technical Conference*, ATC '04, 2004.

Guerra, Jorge et al., "Cost Effective Storage using Extent Based Dynamic Tiering," *In Proceedings of the USENIX Conference on File and Storage Technologies, FAST '11*, Feb. 2011.

Kgil, Taeho et al., "FlashCache: A NAND Flash Memory File Cache for Low Power Web Servers," *CASES '06*, Oct. 23-25, 2006, Seoul, South Korea.

Koller, Ricardo et al., "Write Policies for Host-side Flash Caches," *USENIX Association, 11$^{th}$ USENIX Conference on File and Storage Technologies (FAST '13)*, Feb. 2013.

Li, Sheng et al., "Performance Impacts of Non-blocking Caches in Out-of-order Processors," *Hewlett-Packard Labs and University of Notre Dame*, Jul. 6, 2011.

McKusick, Marshall Kirk et al., "The Design and Implementation of the 4.4BSD Operating System," Addison Wesley, 1996.

Nightingale, Edmund B. et al., "Speculative Execution in a Distributed File System," *ACM Transactions on Computer Systems*, 2006, pp. 361-392.

Nightingale, Edmund B. et al., "Rethink the Sync," *In Proceedings of the 7$^{th}$ USENIX Conference on Operating Systems Design and Implementation, OSID '06*, Nov. 2006.

Soares, Livio et al., "FlexSC: Flexible System Call Scheduling with Exception-Less System Calls," *In Proceedings of the 9$^{th}$ USENIX Conference on Operating Systems Design and Implementation, OSID '10, USENIX Association*, 2010, pp. 1-8.

Tanenbaum, Andrew S. "Modern Operating Systems," *Pearson Education International*, 3$^{rd}$ Edition, 2009, Amsterdam, Netherlands.

Useche, Luis et al., "Truly Non-blocking Writes," *In Proceedings of the USENIX Workshop on Hot Topics in Storage and File Systems, Hot-Storage '11*, Jun. 2011.

Wu, Xiaojian et al., "Exploiting concurrency to improve latency and throughput in a hybrid storage system," *In Proceedings of the IEEE International Symposium in Modeling, Analysis and Simulation of Computer and Telecommunication Systems, MASCOTS '10*, Sep. 2010.

\* cited by examiner

NON-BLOCKING WRITES TO FILE DATA

CROSS-REFERENCE TO RELATED APPLICATIONS

This application claims the priority benefit of U.S. Provisional Application Ser. No. 62/039,713, filed Aug. 20, 2014, which is incorporated herein by reference in its entirety.

GOVERNMENT SUPPORT

This invention was made with government support under grant number CNS-1018262 and CNS-1448747 awarded by the National Science Foundation. The government has certain rights in the invention.

BACKGROUND

Caching and buffering file data within the operating system (OS) page cache is a key performance optimization that has been prevalent for over four decades [7, 26]. The OS stores a subset of data within the OS page cache. When needed by a process for reading or writing data, the OS seamlessly fetches pages into memory from backing storage. File access requests result in "blocking" page fetches within the OS if the page being accessed is not cached in cache memory. This page fetch behavior is common across virtually all systems software that manages DRAM as a caching layer for data that is stored persistently, either locally or remotely.

While read references to out-of-cache data require a blocking page fetch, the same blocking approach has been applied to handle page write requests. Thus, the target page is synchronously fetched before allowing the write to proceed, leading to a "fetch-before-write" constraint [20, 31]. The page fetch-before-write behavior exists in all the latest open-source kernel versions of BSD (all variants), Linux, Minix, OpenSolaris, and Xen. This basic design has also carried over to networked file systems in which a client issues page fetches over the network to a remote file server.

An undesirable outcome of this design is that processes are blocked by the OS from writing data during the page fetch. Writing data to a page not present in the file-system page cache causes the operating system to synchronously fetch the page into memory before it can be written into, effectively making what could be an asynchronous operation perform as though it is a synchronous operation.

Technology trends support page fetch rates sustaining or increasing in the future on several platforms. In server platforms, multi-core systems and virtualization now enable more co-located workloads, leading to larger memory working sets in systems. A recent report from VMware indicated that, of the four main computing resources for a typical system, the average utilization rates for memory space are the highest (at 40%) compared to average utilization rates of less than 10% for the other resources [33]. Furthermore, in personal computing platforms, newer, data-intensive desktop/laptop applications have greater I/O demands [14]. Page fetches and storage I/O also significantly affect the performance of the data-intensive applications on mobile platforms [16]. Flash-based hybrid memory systems and storage caching and tiering systems are also motivated by these trends [6, 12, 27, 15, 35]. A better performing solid-state storage layer combined with the increasingly data intensive nature of many workloads will likely result in event higher page fetch rates in future systems.

BRIEF SUMMARY

Techniques and systems are disclosed for implementing non-blocking writes to eliminate the fetch-before-write requirement by creating in-memory patch(es) for the updated page(s) and unblocking the calling process. Non-blocking writes make page fetches asynchronous and reduce process blocking by buffering the written data elsewhere in memory and unblocking the writing process immediately. In some implementations, subsequent reads to the updated page locations are also made non-blocking.

Techniques for non-blocking writes may enable two additional page fetch policies: asynchronous and lazy, and two page fetch mechanisms: foreground and background. In all cases, pending updates may be merged once the page is in memory. Notably, non-blocking writes work seamlessly inside an OS, requiring no changes to existing applications.

Techniques and systems of the subject invention may be implemented, in some embodiments, as an operating system (OS) enhancement, revision to an existing OS component, special OS component, or enhancement to the software or firmware of the controller software or microcontroller of a storage device or array of storage devices.

Further described is the design and prototypical implementation of non-blocking writes for file data in the Linux OS. An empirical evaluation using a variety of file system intensive benchmarks demonstrates the potential of non-blocking writes in improving the overall performance of systems with little or no loss of performance when workloads cannot benefit from non-blocking writes. For the Filebench workloads, non-blocking writes improve benchmark throughput by as much as 45.4× and 4.2× when files are stored on disk drives and solid state drives respectively. In case of the SPEC SFS2008 benchmark, non-blocking writes decrease overall average latency of NFS operations between 3.5% and 70% and average write latency between 65% and 79%.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DISCLOSURE

Figure 1:
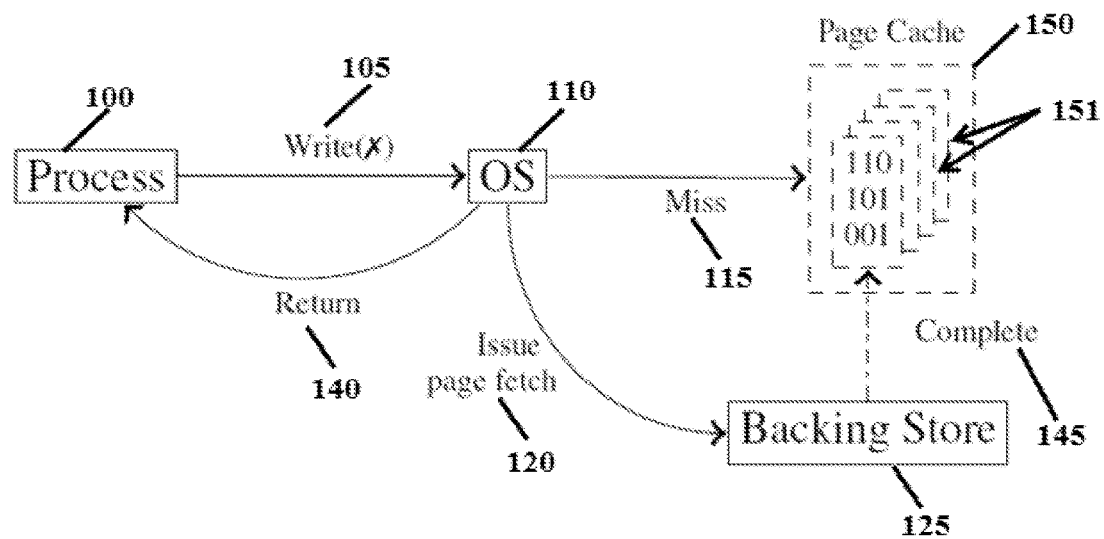
FIG. 1 shows a component diagram with process flow of the blocking behavior on writes associated with traditional "fetch-before-write" systems.

Techniques and systems are disclosed for implementing non-blocking writes to eliminate the fetch-before-write requirement by creating in-memory patch(es) for the updated page(s) and unblocking the calling process. Non-blocking writes make page fetches asynchronous and reduce process blocking by buffering the written data elsewhere in memory and unblocking the writing process immediately. In some implementations, subsequent reads to the updated page locations are also made non-blocking.

Techniques and systems of the subject invention may be implemented, in some embodiments, as an operating system (OS) enhancement, revision to an existing OS component, or special OS component. Techniques may operate within the kernel of an OS. In some cases, techniques and systems can enhance the capabilities of an existing controller, and may, for example, be introduced by upgrading the firmware of the controller. In some implementations, techniques and systems may be included in the control structures of a dedicated hardware device that provides backing store services to other systems, e.g., on a microcontroller of a local or network-accessible storage device/appliance or a card that controls storage device arrays.

The decoupling of page write from page update allows at least two performance enhancements. First, the calling process is free to make progress without having to wait for a slow page fetch I/O operation to complete. Second, the parallelism of page fetch operations increases; this improves page fetch throughput since storage devices offer greater performance at higher levels of I/O parallelism. Applications that access multiple pages not resident in memory during their execution are typically blocked by the operating system, once for each page while fetching it. As a result, operating systems effectively make sequential page fetches for accesses that are supposed to be independent of each other. With non-blocking writes, the operating system is able to fetch pages in parallel taking better advantage of the available I/O parallelism at the device level. Higher levels of I/O parallelism lead to greater device I/O throughput, which ultimately improves page fetch throughput for the application. This new handling of writes to non-cached pages allows processes to overlap more computation with I/O and improves page fetch I/O throughput by increasing fetch parallelism.

In the disclosed techniques and systems, system correctness and application ordering semantics for data writes/reads remain unaltered. The patch creation and patch application mechanisms in non-blocking writes ensure that the ordering of causally-dependent operations is preserved. Various general aspects of the techniques include: (i) reads to recent updates can be served correctly using the most recently created patches; (ii) reads that block on a page-fetch are allowed to proceed only after applying all the outstanding patches, and (iii) reads and writes that are simultaneously issued by different threads/processes (i.e., without any application-level ordering) can be reordered without loss of correctness.

To illustrate concepts that are pertinent to the subject invention, FIG. 1 shows a component diagram with process flow of the blocking behavior on writes associated with traditional "fetch-before-write" systems. In FIG. 1, a write request 105 is issued by a calling process 100 via a request to the OS 110 to perform a data write. A calling process 100 can be any set of instructions that can modify data in a file or persistent storage device of a system. The calling process 100 can be, for example, an application such as a word processor, a system process such as a service or daemon of an operating system, or even a script execution process running a dynamic script.

The write request 105 includes "write data," or data that needs to be updated or added in the file/storage device. Data stored in a file or persistent storage device is, in most modern operating systems, fronted with a cache memory (usually of RAM) that serves to store the most recently used data quickly and accessibly. A write request to update a file, all or part of which has been fronted in the cache memory, is coordinated (often by the OS or other control software) with updates to the cache memory so that data in the cache memory and data in the file remain in proper synchronization.

The backing store 125 persistently holds files or other data streams. A backing store 125 generally has one or more computer-readable media such as, for example, a hard disk drive (HDD), solid state drive (SSD), flash drive, a storage device stored on a network file share, or a combination of one or more such devices. The OS 100 generally issues requests to the backing store 125 to copy all or part of the data from files/streams into cache memory 150 (denoted as element 150 "page cache") in subdivisions or subunits of the cache memory called "data pages." The cache memory 150 shows figures illustrating several data pages 151. A data page is generally a unit of data of a fixed size, the size generally being determined by the type, version, or configuration of the OS 110.

Because the data page is not in the page cache (115 "miss"), the OS 110 issues an instruction to fetch the page (120) from the backing store 125. When the backing store 125 has retrieved the data needed to satisfy the request and the data has been transferred into the page cache (145), the write operation can complete, and the OS 110 returns control to the calling process (140). As this figure illustrates the blocking behaviors associated with traditional systems, the calling process 100 was blocked while awaiting the page fetch and resumes execution only after waiting for the page to be fetched. This blocking is detrimental to performance since it typically requires fetching data from devices that are much slower than cache memory. In the figure, the dash-dotted arrow (145) represents a slow transition, as the backing store is often an HDD or solid state disk (SSD) that can be orders of magnitude slower to access than RAM (hundreds of microseconds to a few milliseconds for HDD/SDD accesses versus a few nanoseconds for RAM).

Notably, the write instruction to the system only requires that data be written to memory. The process does not actually need any of the page data to be read in order to continue execution. However, in traditional architectures, the process issuing a write system call to update a non-cached page would needlessly block on the page fetch preceding the in-memory update.

Figures 2A, 2B:
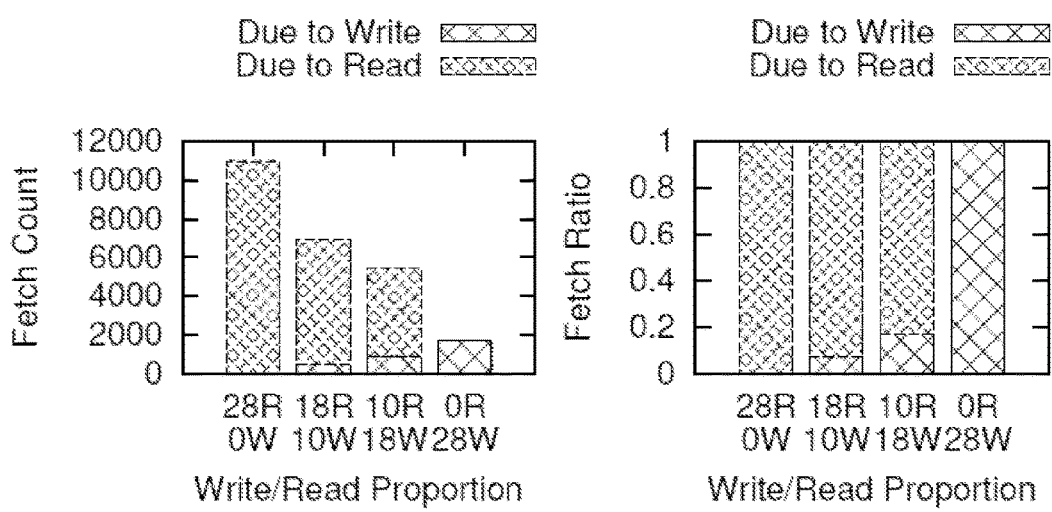
FIGS. 2A-2B show graphs of characteristics for four SPEC SFS2008 benchmark workloads.

The blocking page fetch problem is substantial for real-world workloads. Instrumentation on the Linux OS, for example, can indicate the amount of time processes spent waiting for blocking page fetch operations as well as the fraction of page fetches due to both page reads and writes that could be made non-blocking. FIG. 2A-2B show graphs of characteristics for four SPEC SFS2008 benchmark workloads. As shown in FIG. 2A-2B, there are a substantial number of writes to non-cached pages in a variety of configurations of read/write operations. Depending on the proportion of writes to reads simulated by the benchmark, a substantial fraction of the total number of page cache misses can benefit from non-blocking writes (e.g., 10-20%).

To ameliorate the fetch-before-write requirement, techniques and systems of the subject invention create an in-memory patch for the updated page, allowing the calling process to unblock on the write operation and continue its operations. Techniques may be referred to herein as "non-blocking writes." Non-blocking writes transform the page fetch I/Os caused by writes to non-cached file data into asynchronous, rather than synchronous, operations. A non-blocking write buffers the written data in memory and returns control to the application, allowing the application/process to make progress immediately instead of blocking.

Figure 3:
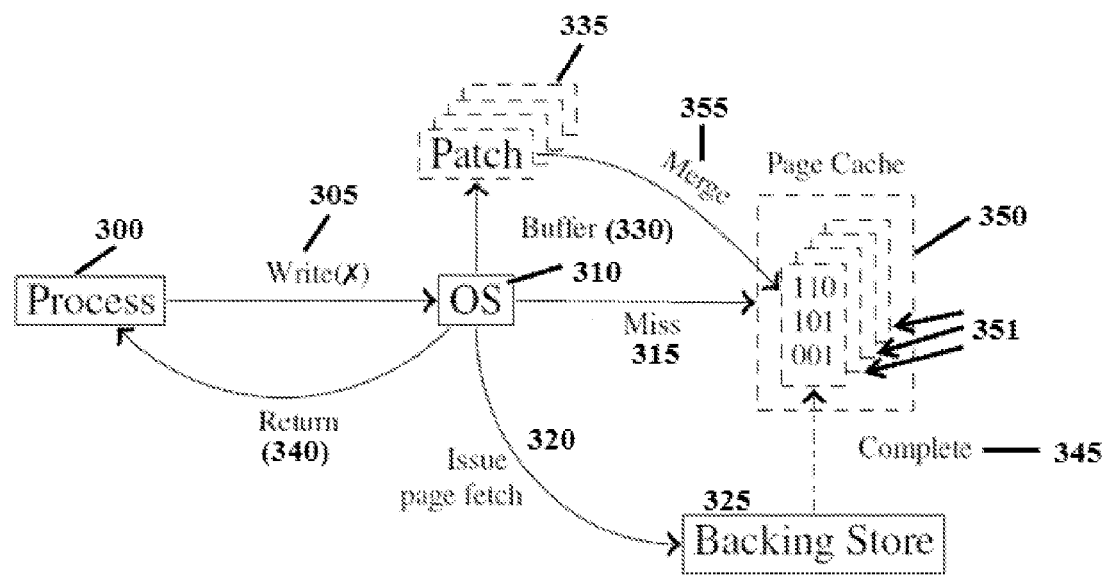
FIG. 3 shows a simplified example component diagram with a process flow for non-blocking writes.

FIG. 3 shows a simplified example component diagram with a process flow for non-blocking writes. A process flow for non-blocking writes, such as illustrated in FIG. 3, may be implemented, e.g., as one or more components of an OS kernel or as part of the controller firmware for a specialized storage device.

A non-blocking write initiates similarly to a traditional blocking write, i.e., a write request 305 is received from a calling process 300 by the OS 310 (or, e.g., the OS-level component, firmware, etc.). This fact illustrates that some embodiments of the disclosed techniques and systems operate by revising the ordering and semantics of activities within system-level components, so that existing applications and processes do not require coding changes.

As before, the data page pertinent to the write request is not among the available pages 351 in the page cache 350, generating a page cache "miss" (315). As a result, the OS component 310 initiates an asynchronous fetch (320) of the missing data page from the backing store 325.

An "asynchronous" operation or function (e.g., a fetch) may be distinguished from a synchronous operation. In a synchronous operation, the instructions of the operation execute in a serial progression, where each instruction is completely performed prior to continuing to the next instruction or function. For example, when an instruction in function A calls a function B, function A waits for function B to complete the entirety of its instructions before function A continues with the instruction after the call to function B. In contrast, an asynchronous operation is characterized by return of control to the caller before the full scope of the operation has been completed. For example, if function B is an asynchronous function, function B immediately returns control to function A, even though function B may merely initiate the process of performing its work. In many implementations, an asynchronous operation may be performed by initiating an additional "thread" of execution according to existing mechanisms provided by the operating system. Further, in many instances, an asynchronous function has a paired notification mechanism (e.g., a "callback function" or event sender/event sink) for informing the calling process of the occurrence of intermediate or concluding activities, such as that the initiated operation has completed successfully or has failed.

A traditional blocking write is synchronous in that the OS does not return control to the process until it has completely performed the write operation, which can include waiting for a page fetch from a slow backing store. In the described techniques of the subject invention, the write data is stored in a memory buffer and the OS component immediately returns control to the process (340) even though the full "write" operation has not been completely performed in the traditional sense. The page fetch operation (320) is issued asynchronously, at a time which varies in accordance with embodiment. At a later time, the OS component 310 may receive a notification when the page fetch has completed successfully and may perform additional activities.

Embodiments of the subject invention may take various approaches to asynchronous fetch operations. In some embodiments, the page fetch I/O request is issued asynchronously before un-blocking the writing process. Thus, the page fetch I/O request is issued in the context of the process performing the write to the file page, i.e., in the foreground relative to the writing process. This may be referred to herein as "foreground asynchronous page fetch." This approach is advantageous both in its simplicity and in the property that, since the page is brought into memory in a relatively timely fashion similar to the synchronous fetch, it is transparent to timer-based durability mechanisms such as dirty page flushing [2] and file system journaling [13] present in some OSs. In certain embodiments, the OS component may initiate the asynchronous fetch of the data page and then assign an additional thread to wait for the callback.

In some cases, issuing the page fetch I/O may involve retrieving additional metadata pages, if these metadata pages are not already cached. In such cases, the process may block for all the metadata fetches preceding the data fetch, negatively impacting certain benefits of the non-blocking behavior. Therefore, in some embodiments, the OS component 310 spawns a background worker thread to initiate the asynchronous fetch of the data page. The writing process moves all work to issue the fetch I/O for the missing data page to a different process context by using a worker thread in the kernel. This approach eliminates blocking of the process due to page misses occurring while obtaining the metadata necessary to issue the page fetch I/O. In the case of metadata page misses, the worker thread would block instead of the calling process, which would allow the calling process to continue its execution. This aspect may be referred to herein as "background asynchronous page fetch."

Before returning control to the calling process, the OS component creates a "patch" 335 containing the write data in a memory buffer area (330). In various implementations, a patch may also contain the target location of the data, its size, a timestamp or ordering number, and other attributes or metadata that facilitate application of the patch to the associated data page once the data page is fetched into memory.

Since some commodity operating systems, such as Linux, handle data with the granularity of pages, in some implementations each patch will apply to a single data page. The patch is thus a data structure that contains all the information to write a data page of data and bring a particular data page up-to-date.

Having initiated the asynchronous fetch of the data page and created the patch, the OS component notifies the calling process, thereby returning control to the calling process (340). The calling process may now proceed with its own subsequent operations as if the write data had actually been written.

As the initial fetch of the data page from the backing storage was asynchronous, the page fetch may not complete until a much later time, relative to the time to create the memory patch. Hence, one aspect of some embodiments of the systems and techniques of the subject invention is to merge the fetched data page with any patches reflecting the write data. This aspect may be triggered in response to receipt by the implementing component of a notification that the data page fetch operation has completed (e.g., 345).

The notification mechanism may be enabled, for example, by a callback function or by an event sink formulated to capture notifications that new data pages have been loaded into the cache memory. When the OS component 310 recognizes that a data page has been loaded into page cache, the OS component 310 merges the page with patches stored in the buffer memory that are related to the data page (355). Patches are applied by copying patch data to the target data page location referenced, for example, in the metadata of the patch.

In some embodiments, after initiating the asynchronous fetch of the data page, the data page or metadata associated with the data page may be marked with an "outdated" state. The outdated state indicates that the data page, after being read from the backing store and into the cache memory, requires the application of one or more patches stored in the buffer having data that has been written but not yet committed to the backing store. An "outdated" state may be a new state, implemented, for example, as an additional state flag value for data pages and/or as an associated metadata attribute. When any pending patches have been successfully applied to the data page, the data page is marked with the "up-to-date" state. This unblocks any processes waiting to read data in the data page.

In certain cases, the addition of a new data page to the page cache may trigger an operation which traverses the patches in the buffer memory, or an index of the patches in the buffer memory. When patches relevant to the data page are found, the data page is merged with the patches.

Operating systems allow writes to file data via two common mechanisms: system calls and memory mapped access. The former class of writes is supervised since the OS is involved in each access; the latter class is unsupervised. With supervised writes, the OS uses the system call arguments—the address of the data buffer to be written, the size of the data, and the file (and implicitly, the offset) to write to—and resolves this access to a page write. With blocking writes, if the page is not cached, the OS allocates a page of memory to read in the data from the backing store. The OS then issues a blocking fetch for the page, applies the requested update once the page is in memory, and only then unblocks the writing process. In contrast, in some embodiments of non-blocking writes, an OS can extract the data update from the system call invocation using the address and size of the data buffer arguments, create a patch, and queue the patch for later use. This patch is applied later when the data page has been read into memory from the backing store.

Unsupervised file access occurs, for example, when a portion of a file is "memory mapped" to a portion of the process address space. The processor can then write directly to memory without OS supervision (i.e., in user-mode). If the needed data page is not available in memory at the moment of access, the processor generates a "page fault" that is handled by the OS by fetching the data page from its backing store. In some implementations, unsupervised file access may be handled correctly by simply write-blocking the process when servicing a page fault. This behavior effectively preserves expected read-write sequencing by defaulting to the traditional behavior for unsupervised file access activities. However, in some implementations, patches may be created without blocking the write by using instruction disassembly to extract the information needed to create the patch.

When a page is read, for example because a system call induced the page fetch or because a memory-mapped access caused a page fault, outstanding patches, if any, are applied to the page to bring it up-to-date before the page is made accessible.

Scenarios may arise in which multiple disjoint overwrites to the same data page occur before the data page has been retrieved from the backing store. In some embodiments, per-page patch queues are used to order the patches issuing from disjoint overwrites to the same page. The buffer memory may have a variety of such patch queues, each one storing in first-in-first-out (FIFO) order the various patches for a data page. In such embodiments, the operation of creating the patch further includes inserting the patch into a FIFO queue associated with the data page.

Controlling access to the FIFO queue may be necessary to prevent the simultaneous adding of multiple patches to a FIFO queue at the same time, confusing the ordering of the FIFO queue. Thus, in some implementations a single-holder lock mechanism (e.g., a mutex or other similar construct) may control access to each FIFO queue so that a single patch at a time may be inserted into the FIFO queue in the order of acquisition of the lock mechanism. Techniques of controlling access to data structures with lock mechanisms are familiar to practitioners in the art.

When the data page is subsequently loaded, the patches in the associated patch queue may be later applied in FIFO order to update the data page.

Figure 4:
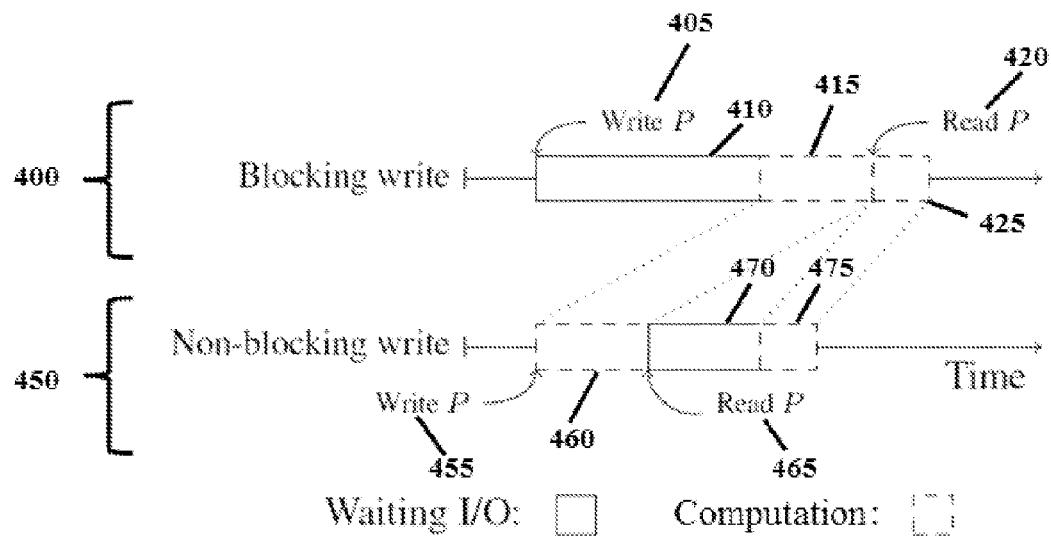
FIG. 4 shows a graphical representation of a timeline comparing activities of a conventional blocking write versus a non-blocking write of the subject invention.

FIG. 4 shows a graphical representation of a timeline comparing activities of a conventional blocking write versus a non-blocking write of the subject invention. In FIG. 4, Page P, not present in the page cache, is written. The timelines in FIG. 4 are divided into "Waiting I/O" time (solid line) and "Computation" time (dashed line). In the blocking write scenario 400, the write instruction 405 is issued, which immediately blocks for a time period 410 while waiting on I/O completion while the data page is loaded from the backing store. When the application is done waiting, computation time 415 follows to perform the data write. A later read to Page P (420) is followed by the computation time for the reading operation 425.

In the non-blocking write scenario 450, a write of P (455) is initiated, which immediately returns to the calling process. Since the write returns immediately, computation in the calling process (460) and I/O are performed in parallel. Later, when the read of P (465) begins, a period of I/O initiates 470, followed by computation time 475.

Non-blocking writes can also increase page fetch parallelism. Processes that access multiple pages not resident in cache memory during their execution are typically blocked by the OS, once for each page while fetching it. An unintended consequence of this behavior is that OSs end up ordering or sequencing page fetches for accesses that are, in fact, independent of each other. With non-blocking writes, the OS is able to fetch pages in parallel to take better advantage of the available I/O parallelism at the device level.

Figure 5:
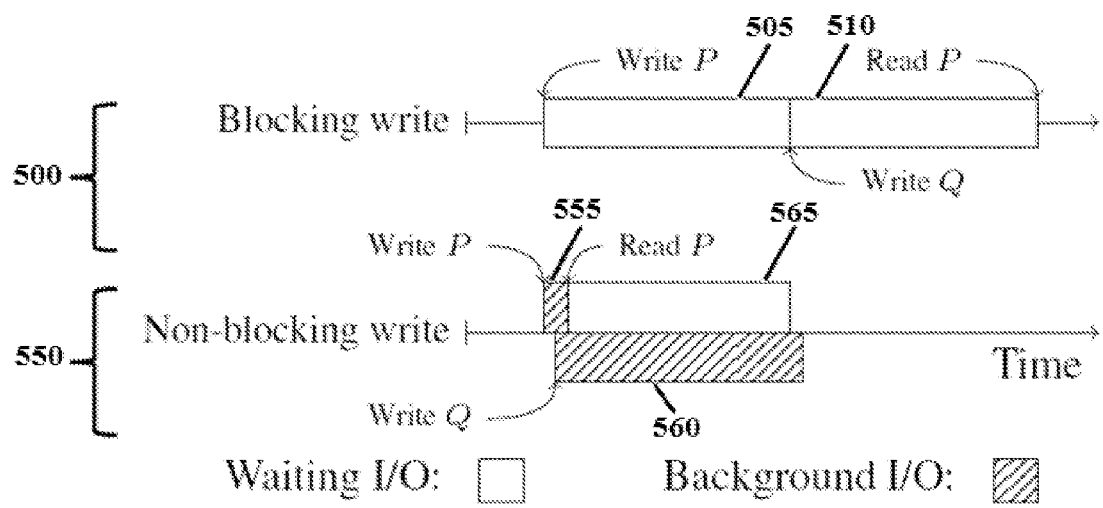
FIG. 5 shows a graphical representation of a timeline showing improvements to page fetch parallelism in systems using the non-blocking writes of the subject invention.

FIG. 5 shows a graphical representation of a timeline showing improvements to page fetch parallelism in systems using the non-blocking writes of the subject invention. In FIG. 5, two non-cached pages, P and Q, are written. In the blocking write scenario 500, the page fetches effectively get serialized (505, 510), even though they may be unrelated. In the non-blocking write scenario 550, P and Q get fetched in parallel for the write operations (555, 560). The read to P (565) still blocks until the page is fetched. Higher levels of I/O parallelism lead to greater device I/O throughput, which ultimately improves page fetch throughput for the process and even for the underlying devices.

Non-blocking writes of the subject invention mean that process execution is not necessarily dependent on a data page being available in memory. For this reason, page fetch may be deferred or even eliminated in some embodiments of the subject invention.

Page fetch deferral and elimination have the advantage of providing management and reduction of both memory consumption and the page fetch I/O traffic to backing stores. While page fetch deferral is opportunistic, page fetch elimination is possible when the patches that get created are sufficient to overwrite the page entirely. Various implementations highlight the opportunities enabled by non-blocking writes for further optimizing resource consumption and improving performance.

A "lazy fetch" behavior can be implemented in some embodiments of the subject invention by not initiating a fetch of the data page from the backing storage during processing of the write request to a non-cached page. The OS delays page fetch until the page fetch becomes unavoidable, such as in response to a read request or durability request. Lazy fetch is an aggressive mode which has the potential to further reduce the system's resource consumption. In principle, page fetch elimination may even be possible if subsequent patches that get created for the same page can be combined to overwrite the requested page entirely.

"Lazy fetch" creates new system scenarios. The first scenario occurs if a future page read cannot be served using the currently available patches for the non-cached page. In this case, since the page fetch is unavoidable, the system fetches the page synchronously and patches are applied before the reading process is unblocked. The second scenario occurs if the patches created for the page are sufficient to fully re-construct page data. In this scenario, the data page can be overwritten in its entirety from patches in the buffer memory.

In the second scenario, so long as durability of data in the page is not necessary until the time the page gets entirely overwritten, the original page fetch is eliminated entirely. File data durability issues arise in the following instances: (i) synchronous file write by an application, and (ii) periodic flushing of dirty pages by the OS [2] or page writes to a write-ahead log in a journaling file system [13, 25]. Either of these instances may be indicated by a "durability request" which would show that a persisted data page needed to be flushed to the backing store. If page durability becomes a necessity prior to the page being overwritten, the page can be fetched synchronously, merged with any patches having updates to the data page, and then marked as safe to flush to the backing store. This occurs before the flush operation to the backing store is executed so that there is no loss of correctness or integrity.

Figure 6:
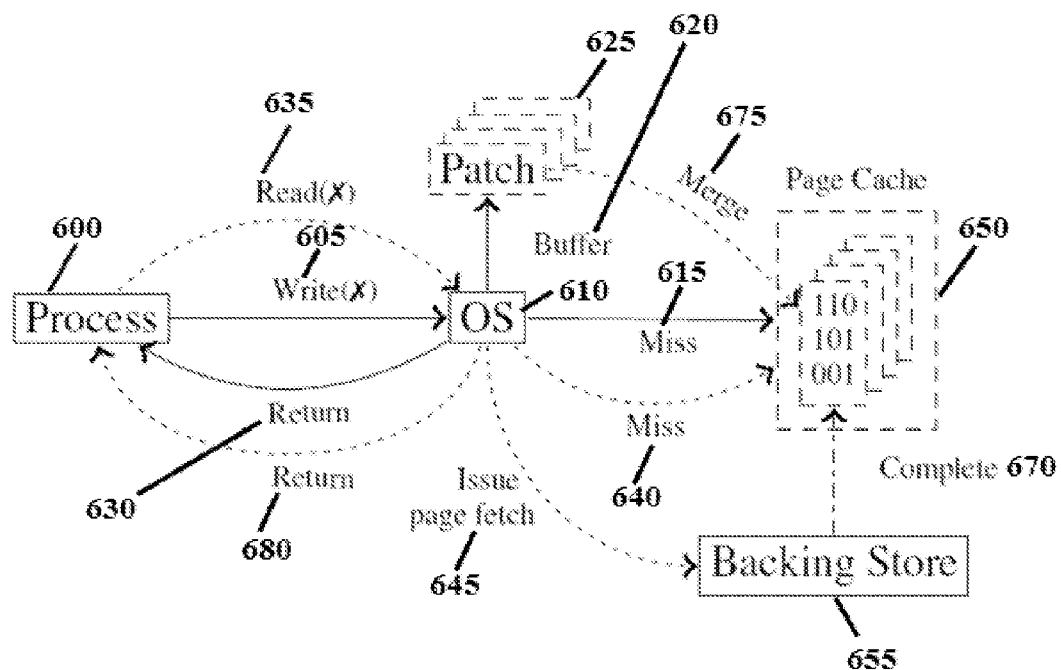
FIG. 6 shows a simplified example component diagram with a process flow for non-blocking writes with "deferred fetch" or "lazy fetch."

FIG. 6 shows a simplified example component diagram with a process flow for non-blocking writes with "deferred fetch" or "lazy fetch." In FIG. 6, a write request 605 is issued by a process 600 to the OS component 610. A review of the cache memory 650 determines that the data page associated with the write is not in the cache ("miss" 615). As a result the write data is written 620 to a patch 625 in the buffer memory. Control is returned to the calling process 630. Note that, in contrast to embodiments described in FIG. 3, no page fetch instruction was issued to the backing store during the write request processing.

When a read request 635 is received by the OS component 610 for the requested data page, a review of the cache memory determines that the data page associated with the read request is not in the cache (640). In some implementations the buffer memory may be examined for the existence of patches that can service the read request. If the necessary patches can fully reconstruct the missing data page, then the patches 625 are merged to form the updated data page, which is then placed in the data cache. If the necessary patches cannot fully reconstruct the missing data page, then the OS component 610 issues a synchronous page fetch instruction (645) to the backing store 655. The synchronous page fetch blocks until completed (670), and then any available patches are merged to the data page (675). Finally, the OS component 610 returns control (680) to the calling process 600.

Similarly to writes, reads can be classified as supervised and unsupervised, depending on the implementation. In traditional systems, supervised reads to non-cached pages block the calling process. However, with non-blocking writes, a new opportunity to perform non-blocking reads becomes available. Specifically, if the read is serviceable from one of the patches queued on the page, then the read request can be satisfied and the reading process unblocked immediately without incurring a page fetch I/O. This occurs with no loss of correctness since the patch contains the most recent data written to the page. The page locations being read from, and the target area to read into, are available as system call arguments. Since this is a read operation to a contiguous area, a lookup into the patch queue determines if the read is serviceable using the queued patches. The read is not serviceable if any data for the read is not contained within the patch queue and the reading process blocks. If all data being requested is contained in the patch queue, the data is copied into the target buffer and the reading process is unblocked.

For unsupervised reads, one implementation blocks the process for the page fetch. Since outstanding patches get applied immediately upon page fetch before unblocking the reading process, the unsupervised read accesses up-to-date data.

Figure 11:
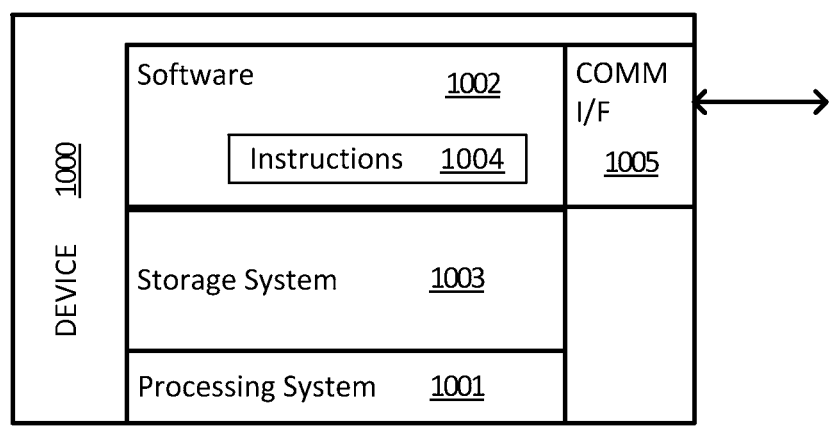
FIG. 11 shows a block diagram illustrating components of a computing device or system used in some implementations or embodiments incorporating techniques and systems for non-blocking writes as described herein.

FIG. 11 shows a block diagram illustrating components of a computing device or system used in some implementations or embodiments incorporating techniques and systems for non-blocking writes as described herein. For example, any component of the system, including a non-blocking write component of an OS, may be implemented as described with respect to device 1000, which can itself include one or more computing devices. The hardware can be configured according to any suitable computer architectures such as a Symmetric Multi-Processing (SMP) architecture or a Non-Uniform Memory Access (NUMA) architecture.

The device 1000 can include a processing system 1001, which may include a processing device such as a central processing unit (CPU) or microprocessor and other circuitry that retrieves and executes software 1002 from storage system 1003. Processing system 1001 may be implemented within a single processing device but may also be distributed across multiple processing devices or sub-systems that cooperate in executing program instructions.

Examples of processing system 1001 include general-purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Storage system 1003 may comprise any computer readable storage media readable by processing system 1001 and capable of storing software 1002 including, e.g., processing instructions components implementing non-blocking writes. Storage system 1003 may include volatile and nonvolatile, removable and non-removable media implemented in any method or technology for storage of information, such as computer readable instructions, data structures, program modules, or other data.

Examples of storage media include random access memory (RAM), read only memory (ROM), magnetic disks, optical disks, CDs, DVDs, flash memory, solid state memory, phase change memory, or any other suitable storage media. Certain implementations may involve either or both virtual memory and non-virtual memory. In no case do storage media consist of a propagated signal. In addition to storage media, in some implementations, storage system 1003 may also include communication media over which software 1002 may be communicated internally or externally.

Storage system 1003 may be implemented as a single storage device but may also be implemented across multiple storage devices or sub-systems co-located or distributed relative to each other. Storage system 1003 may include additional elements capable of communicating with processing system 1001. Storage system may provide or contain a backing store as described herein.

Software 1002 may be implemented in program instructions and, among other functions, may, when executed by device 1000 in general or processing system 1001 in particular, direct device 1000 or processing system 1001 to operate as described herein for facilitating non-blocking writes. Software 1002 may provide program instructions 1004 that implement components for enabling non-blocking writes. Software 1002 may implement on device 1000 components, programs, agents, or layers that implement in machine-readable processing instructions 1004 the methods and techniques described herein.

In general, software 1002 may, when loaded into processing system 1001 and executed, transform device 1000 overall from a general-purpose computing system into a special-purpose computing system customized to facilitate non-blocking writes in accordance with the techniques herein. Indeed, encoding software 1002 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage. Software 1002 may also include firmware or some other form of machine-readable processing instructions executable by processing system 1001. Software 1002 may include additional processes, programs, or components, such as operating system software and other application software. Software components for non-blocking writes may be implemented such that they integrate with operating system software of existing systems, for example the LINUX, ANDROID, or MICROSOFT WINDOWS operating systems.

Device 1000 may represent any computing system on which software 1002 may be staged and from where software 1002 may be distributed, transported, downloaded, or otherwise provided to yet another computing system for deployment and execution, or yet additional distribution.

A communication interface 1005 may be included, providing communication connections and devices that allow for communication between device 1000 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

It should be noted that many elements of device 1000 may be included in a system-on-a-chip (SoC) device. These elements may include, but are not limited to, the processing system 1001, a communications interface 1005, and even elements of the storage system 1003 and software 1002.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Following are examples that illustrate procedures for practicing certain disclosed techniques and/or implementing disclosed systems. Examples may also illustrate advantages, including technical effects, of the disclosed techniques and systems. These examples should not be construed as limiting.

Non-blocking writes enhance the behavior and control flow of current systems. An overview of a system implementation, for example on a device 1000 as described in FIG. 11, is presented and discussed. Details of the implementation in relation to preserving semantic correctness with non-blocking writes are also described. It should be noted that implementation in this manner is not intended to limit disclosed techniques only to particular environments.

In one implementation, non-blocking writes for file data were implemented in the Linux OS kernel as two independent components. The first modifies the generic virtual file system (VFS) layer and second modifies the network file system (NFS) client layer within the OS. The component completely contained within the VFS layer is convenient since it becomes independent of the actual underlying file system. Unlike the conventional Linux approach, all handling of fetch completion (such as applying patches, marking a page dirty, and unlocking it) with non-blocking writes occurs within the bottom-half I/O completion handler. Implementations of asynchronous non-blocking writes using a background worker thread to spawn the page fetch ("NBW-Async-BG") take advantage of the Linux OS worker thread infrastructure.

The described implementation does not use non-blocking writes for accesses (writes and reads) to missing file-system cache pages that are initiated internally by the OS. These include file system metadata page updates and updates performed by kernel threads (e.g., the bdflush dirty page flushing thread and the kjournald journaling thread for the ext3 file system in Linux). For instance, when a journaling thread writes a file data page to storage, the thread is blocked until it is first read into memory, if not present, updated by merging any pending patches, and then unblocked to write the page out to storage. This mechanism preserves semantic correctness by providing the durability properties expected by OS services.

Generally, from the moment a non-blocking write operation starts until it finishes, multiple operations like read, prefetching, synchronous write, and flush can be issued to the page. Operating systems synchronize these operations to keep the consistency and return only up-to-date data to applications. The implementation achieves synchronization by complying with the Linux page locking protocol. A page is locked before performing a non-blocking write for it; this allows handling of all page-level operations within the kernel (such as fsync and mmap) correctly. These mechanisms block on the page lock, which becomes available only after the page is fetched and patches are applied, before proceeding to operate on the page. For instance, memory-mapped accesses to pages involved in non-blocking writes fault, just as in the blocking write case, and the fault handler blocks on the page lock. The first non-blocking write to a page indexes the new allocated page in the page cache tree to make it public to other kernel subsystems. It then acquires the page lock to block future operations on the page. The only exception to such page locking is writing to a page already in the non-blocking write state, which does not lock the page to queue a new patch.

Non-blocking writes may alter the sequence in which patches get applied to their destination addresses, since asynchronous page fetches can occur out of order. Here, non-blocking writes only replace writes that are to memory and which are not guaranteed to be reflected to persistent storage in any particular sequence; therefore, ordering violations in updates of destination locations are crash-safe.

If a process would like explicit disk ordering for these memory page updates, the process would execute a blocking flush operation (e.g., fsync) subsequent to each operation. The flush operation would cause the OS to obtain the page lock, wait for the page fetch, and apply any outstanding patches before flushing and returning control to the application; ordering of disk writes would thus be preserved with non-blocking writes.

The implementation changes the semantics of the OS with respect to notification of errors to a process that writes to non-cached pages. Since page fetches on writes are done asynchronously, disk I/O errors (e.g., EIO returned for the UNIX write system call) during the asynchronous page fetch operation would not get reported to the process. If the application were to take differential action under such states, such action may be engaged with a delay or not at all. Semantically, the application write was a memory write and not to persistent storage; thus, an I/O error being reported by current systems to a calling process is actually an unnecessary artifact of the fetch-before-write design. With non-blocking writes, if the write were to be made persistent at any point via a flush issued by the process or the OS, any I/O errors during page flushing would be reported to the initiator.

The implementation fully supports SMP and kernel preemption. This requires supporting simultaneous patch creation for the same page either due to (1) simultaneous write system calls to the same page on different cores, or (2) kernel preemption that interrupts patch creation and yields the CPU to another process that creates patches for the same page. The implementation uses a single additional lock of the patch queue to protect it from simultaneous access.

Since page fetch on a write miss gets delayed in the asynchronous and lazy/deferred modes, it is possible that an application deletes a file from the backing store before all its modified pages are made up-to-date. In this situation, orphan patches can leak memory. The implementation addresses this issue by first discarding any outstanding patches associated with pages of a file before the file gets deleted.

Computational Results.

Performance metrics were gathered through instrumentation of the previously described Linux implementation in order to understand several performance properties and advantages. These include: (1) Effect of non-blocking writes for different workloads; (2) relative performance of the varying fetch modes of non-blocking writes; and (3) sensitivity of non-blocking writes to system parameters including storage type and memory size.

The conventional approach is compared to three different implementations of non-blocking writes. Blocking writes (BW) is the conventional approach to handling writes and uses the Linux kernel implementation. Non-blocking writes variants include asynchronous mode using foreground (NBW-Async-FG) and background (NBW-Async-BG) fetch, and lazy mode (NB W-Lazy).

Computational results are derived from the Filebench micro-benchmark and the SPEC SFS2008 benchmark. Filebench is used to address issues (1), (2), and (3) using controlled workloads. The SPEC SFS2008 benchmark is used to further analyze questions (1) and (2) under more realistic workloads. The Filebench evaluation was performed using a Quad-Core AMD Opteron™ Processor 1381 with 8 GB of RAM using a 500 GB WDC WD5002ABYS hard disk and a 32 GB Intel® X25-E SSD running Gentoo Linux (kernel 2.6.34.17). The above setup was also used to run the client-side component of the SPEC SFS2008 benchmark. Additionally, the SPEC SFS2008 benchmark was run on a Quad-Core AMD Opteron™ Processor 1356 with 7 GB of RAM using a 500 GB WDC and 160 GB Seagate disks running Gentoo Linux (kernel 2.6.34.17) as the NFS server. The 500 GB hard disk holds the root file system, while the 160 GB hard disk holds the file system exported through NFS.

Filebench Micro-Benchmark.

For all the following experiments five Filebench personalities were run for 60 seconds after clearing the contents of the OS page cache. Each personality represents a different type of workload. The system was configured to use 4 GB of main memory and the maximum amount of memory that could be allocated for patches was configured as 64 MB. The number of operations per second reported by the benchmark after each execution is shown, unless otherwise noted. Each data-point is calculated using the average of 3 executions.

Figure 7:
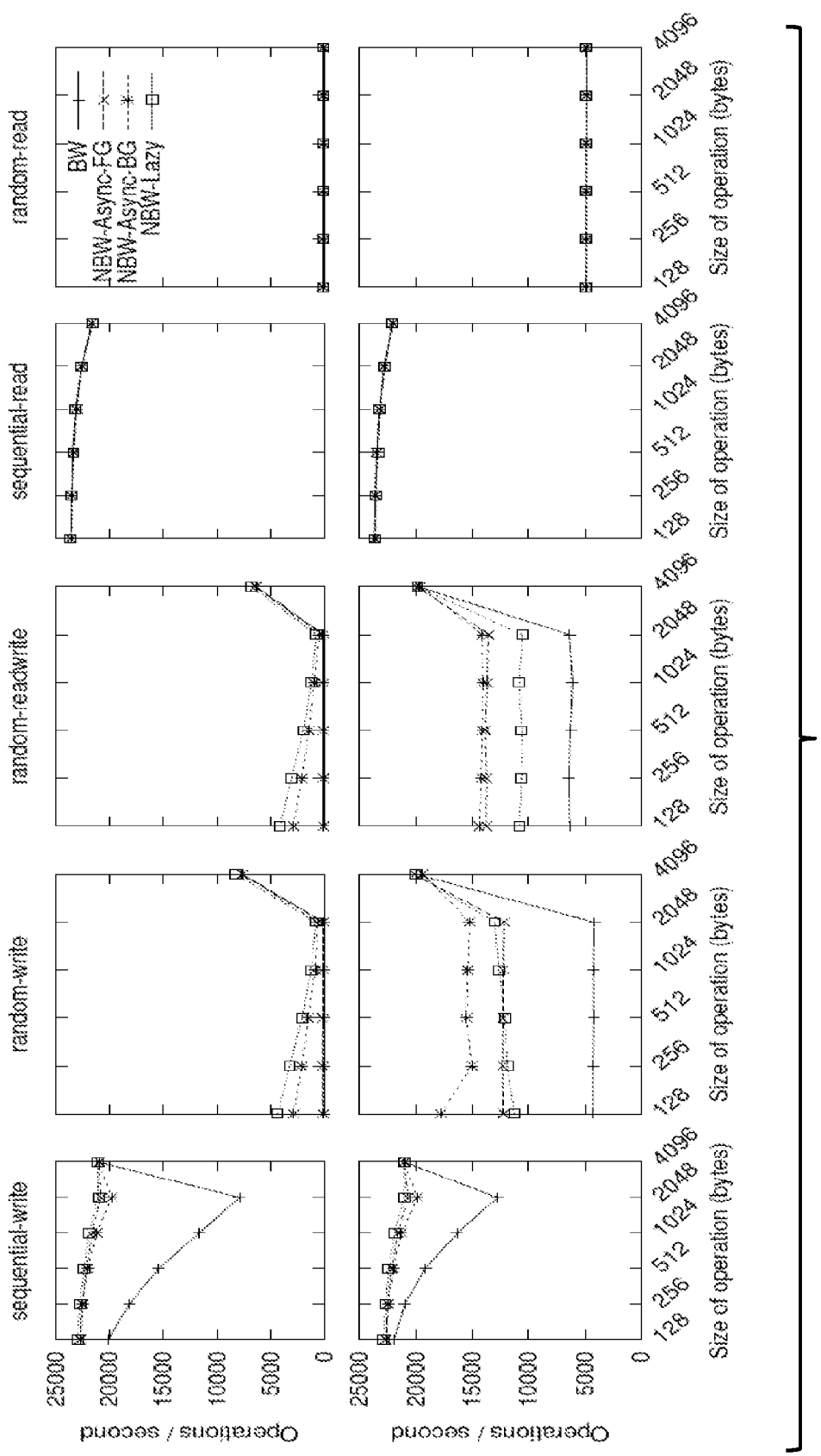
FIG. 7 shows plots of various Filebench performance metrics.

FIG. 7 shows plots of various Filebench performance metrics. The base results present executions of Filebench using a hard disk as the storage back-end, reporting Filebench performance metric operations per second. This base result appears in the first row (containing five plots) of FIG. 7, depicting performance for five different Filebench personalities (workload patterns) when varying the I/O size issued by Filebench. In FIG. 7, the two rows correspond to two different storage back-ends: hard disk-drive (top) and solid-state drive (bottom). Each point on the X-axis represents an execution of the benchmark at the specified I/O size.

The first three plots of FIG. 7 correspond to personalities that perform write operations. A common observation here is that, at 4 KB I/O size (size of a single page), the non-blocking writes modes perform similarly to blocking writes. At 4 KB, there is no fetch-before-write behavior because every write results in an overwrite of an entire page. Thus, non-blocking writes is not engaged and does not impose any overhead either.

For the sequential-write personality, the operations/sec achieved with conventional blocking-writes depends on the operation size and is ultimately limited by the number of page misses per operations issued. In the best case, when the I/O size is equal to 128 bytes, there would be only one blocking fetch every 32 writes. In the worst case, when I/O size is equal to 2 KB, every two writes involve a blocking fetch. There was a slight decrease in performance indicated as I/O sizes increase because of the time that the benchmark takes to traverse the I/O stack and memcpy the data from user-space to its destination. NBW-Async-FG and NBW-Lazy deliver better performance at 2 KB than at 4 KB I/O size, indicating that blocking overheads for these two modes are negligible. In comparison, NBW-Async-BG provides slightly worse performance due to the overhead of scheduling work in different threads and related thread management. On average, the different non-blocking writes modes provide a performance improvement of 13-160% depending on the I/O size.

The second and third personalities represent random access workloads. However, random-write is a write-only workload, while random-readwrite is a mixed workload; the latter uses two threads, one dedicated for issuing reads and the other for writes. For a 4 KB I/O size, random-readwrite provides slightly lower performance than random-write due to the higher latency of blocking read misses. For I/O sizes smaller than 4 KB, BW provides a constant throughput of around 97 and 146 ops for random-write and random-readwrite personalities, respectively. Performance is consistent regardless of the I/O size because each operation is equally likely to result in a page miss and fetch. The random-readwrite personality performs better than random-write due to the additional available I/O parallelism when two threads of execution are used.

For random-write, NBW-Async-FG provides a 50-60% performance improvement (not very visible in the plot because of axis resolution) due to reduced blocking for page fetches of the process. However, this improvement does not manifest for random-readwrite because read operations present higher latencies due to additional blocking for pages with fetches in progress. In both cases the benefits of NBW-Async-FG are significantly lower when compared to other non-blocking writes modes, since NBW-Async-FG blocks on many metadata misses during this short-running experiment. This metadata includes direct and indirect blocks necessary to issue the page fetches asynchronously.

In contrast, NBW-Async-BG unblocks the process immediately, instead offloading the block to a different kernel thread for the metadata fetch. This mode shows a 6.7 times to 29.5 times performance improvement for random-write, depending on the I/O size. The performance gain reduces as I/O size increases since non-blocking writes can create fewer outstanding non-blocking writes to comply with the imposed patch memory limit of 64 MB. A similar trend is observed for random-readwrite with performance improvements varying from 3.4 times to 19.5 times BW, depending on the I/O size used.

NBW-Lazy provides an additional 23-54% performance improvement over NBW-Async-BG by also eliminating page and metadata fetches whenever possible. When the available patch memory limit is reached, writes are treated as in BW until more patch memory is freed up.

The remaining two personalities of the top row of FIG. 7, sequential-read and random-read, are read-only workloads. These workloads do not create write operations and thus non-blocking writes renders the same performance of the blocking-write system. Thus, the overhead of using a non-blocking writes kernel is zero for read-only workloads.

Sensitivity analysis of non-blocking writes addresses the following specific issues: (1) the benefits of non-blocking writes when using different types of devices in the backing store; and (2) performance of non-blocking writes as system memory size is varied.

To answer issue (1), non-blocking writes were evaluated using a better-performing solid state drive (SSD) for the backing store. The bottom row of FIG. 7 presents results when running the five Filebench personalities using an SSD.

Trends with the sequential-write reported results that are almost identical to the hard disk counterparts (top row in FIG. 7) for all modes of non-blocking writes. This is because non-blocking writes are able to completely eliminate the latency of accessing storage from the latency experienced by the benchmark on every operation in both systems. Consequently, the type of storage does not influence the performance of the benchmark. On the other hand, BW presents an increase in throughput for every size below 4 KB due to the faster SSD device. In summary, the different non-blocking writes modes provide between 4% and 61% performance improvement, depending on the I/O size, over BW.

For the random-write and random-readwrite personalities, the non-blocking writes variants all improve performance in varying degrees. The SSD had significantly lower latencies servicing random accesses, relative to the hard drive, which allowed metadata misses to be serviced much more quickly. The efficiency of NBW-Async-FG relative to BW is further improved relative to the hard disk system, delivering 188% and 117% performance improvement for random-write and random-readwrite respectively. NBW-Async-BG improves over NBW-Async-FG for reasons similar to those with hard disks; it delivers 272% and 125% performance improvement for random-write and random-readwrite respectively.

Although NBW-Lazy performs significantly better than BW, its performance improvements were lower in comparison to the NBW-Async modes. When the patch memory limit is reached, NBW-Lazy takes longer than the other modes to free its memory given that the fetches are issued only when blocking cannot be avoided anymore. While the duration of the experiment is the same as for the HDD, a faster SSD results in the patch memory limit being met more quickly. In the current implementation, after the patch memory limit is met and no more patches can be created, NBW-Lazy defaults to a BW behavior, issuing fetches synchronously for handling writes to non-cached pages. Given the additional parallelism available on solid state drives it may be more efficient for these workloads to issue fetches as soon as possible to increase the level of I/O parallelism. Despite this, NBW-Lazy mode shows 163-211% and 70% performance improvement for random-write and random-readwrite, respectively.

Finally, as with HDDs, for SDDs the last two Filebench personalities, sequential-read and random-read, do not create write operations and non-blocking writes incurs negligible overhead and delivers performance equivalent to blocking writes.

Figure 8:
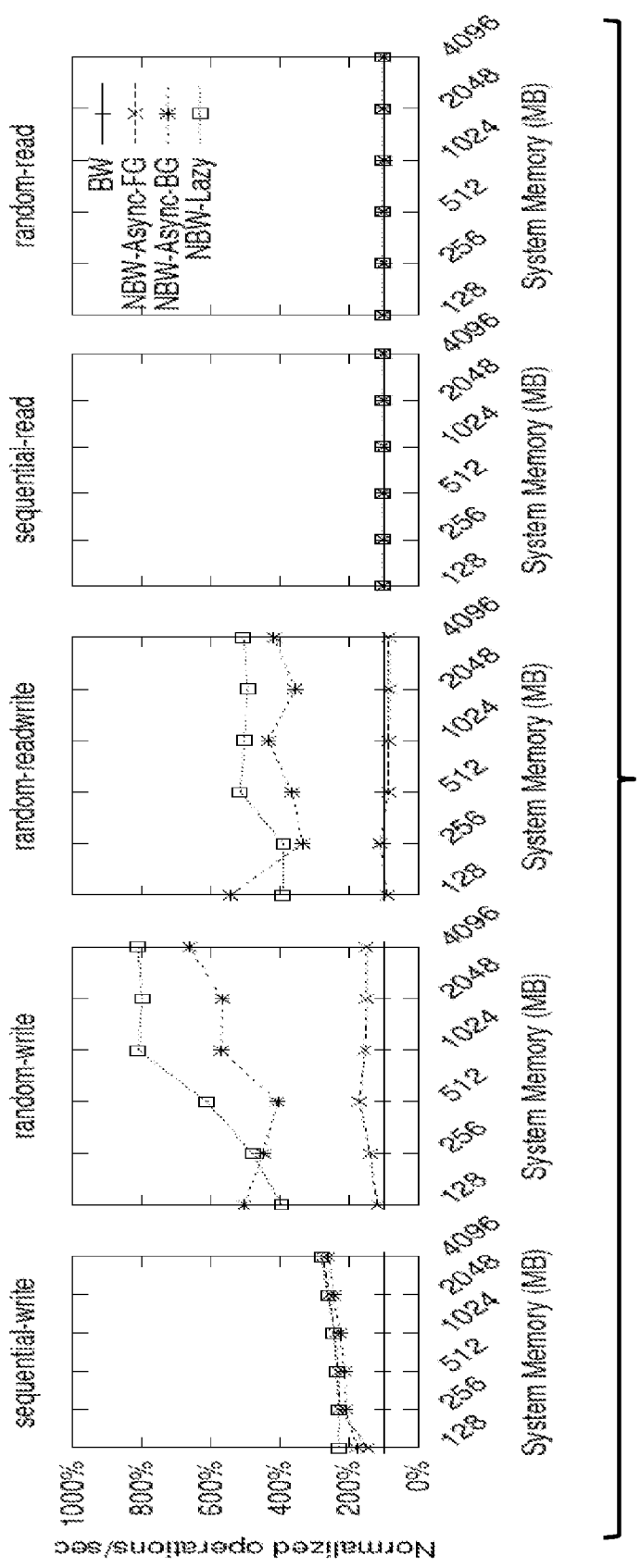
FIG. 8 shows the results of five Filebench workloads with different amounts of system memory.

The second issue, sensitivity to system memory size, is investigated using the Filebench workloads with varying amounts of system memory available to the operating system. FIG. 8 shows the results of five Filebench workloads with different amounts of system memory. For these experiments, a HDD was used as the backing store, the I/O size was fixed at 2 KB, and the patch memory limit was set to 64 MB.

For the sequential-write workload, the non-blocking writes variants perform 45-180% better than BW, and each non-blocking variant benefits from more system memory (BW does not). Naturally, NBW-Lazy performs better in this workload because (a) it uses very little patch memory, sufficient to hold enough patches until the whole page is overwritten, and (b) since pages get overwritten entirely in the sequential write, it eliminates all page fetches.

Figure 9:
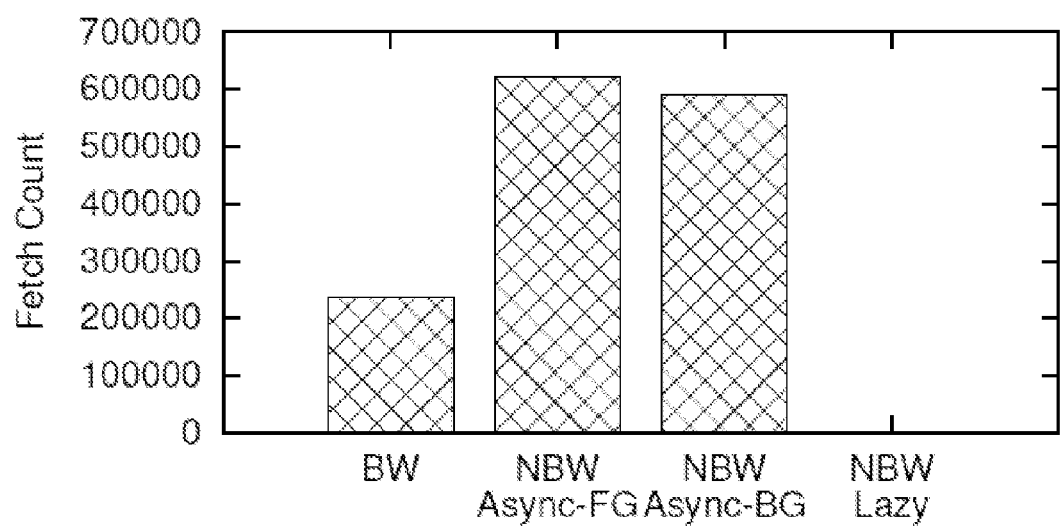
FIG. 9 depicts the number of page fetches for the sequential-write workload.

FIG. 9 depicts the number of page fetches for the sequential-write workload. For BW, NBW-Async-FG, and NBW-Async-BG, the number of fetches is proportional to the number of operations per second reported for these runs. On the other hand, NBW-Lazy performs zero fetches for reasons stated earlier.

Returning to FIG. 8, the performance of BW was not affected by variations in available system memory for random-write and random-readwrite workloads. Since I/Os to HDDs slow down the execution of the benchmark, the system does not run out of system memory even for the smaller memory configurations, so adding more memory makes no difference. NBW-Async-FG delivers almost constant performance across the various system memory configurations. NBW-Async-BG and NBW-Lazy offer significant performance gains (relative to BW) of as much as 560% and 710% respectively. NBW-Lazy delivers performance improvements when more memory is added to the system. These improvements grow until the imposed patch memory limit is met during the execution, beyond which adding more memory makes no difference.

SPEC SFS2008 Macro-Benchmark.

The SPEC SFS2008 benchmark tests the performance of NFS servers. Tests of an embodiment using a non-blocking writes kernel was installed in the NFS server, which exported the network file system in asynchronous mode to exercise non-blocking writes. SPEC SFS uses a client side workload generator that bypasses the page cache entirely. The client was configured for a target load of 500 operations per second. The SPEC SFS performance metric was obtained, which is the operation latency reported by the NFS client; all results include a constant overhead contributed by the network latency for communicating with the server.

SPEC SFS operations are classified as write, read, and others which includes metadata operations such as create, remove and getattr. For each of the non-blocking writes modes and the conventional blocking writes solution, results were obtained for the above three classes of operations separately as well as the overall performance that averages across all operations. Further, performance was evaluated when varying the relative proportion of NFS operations issued by the benchmark and report results in FIG. 10. The default configuration as specified in SPEC SFS2008 is: reads (18%), writes (10%) and others (72%). In addition, three modified configurations were evaluated: no-writes, no-reads, and one that uses: reads (10%), writes (18%), and others (72%) to examine a wider spectrum of behaviors.

As discussed, even for configurations that contained more writes than reads (e.g., 18% writes and 10% reads) the actual fraction of cache misses upon writes is far lower than the fraction of misses due to reads (i.e. 16.9% write misses vs. 83.1% read misses). This mismatch is explained by noting that each read access to a missing page results in a read miss, but not all write accesses to missing pages lead to write misses. Further, Table 1 shows that only 39% of all writes issued by the SPEC SFS2008 are partial page overwrites which may result in non-blocking writes.

TABLE 1

SPEC-SFS operation size/type distribution.

| Operation Size | Read % | Cum. Read % | Write % | Cum. Write % |
| --- | --- | --- | --- | --- |
| 1-511 bytes | 3 | 3 | 13 | 13 |
| 512-1023 bytes | 1 | 4 | 3 | 16 |
| 1024-2047 bytes | 2 | 6 | 7 | 23 |
| 2048-4095 bytes | 1 | 7 | 5 | 28 |
| 4 KB | 16 | 23 | 11 | 39 |
| 4097-8191 bytes | 6 | 29 | 3 | 42 |
| 8 KB | 36 | 65 | 30 | 72 |
| 8193-16383 bytes | 7 | 72 | 7 | 79 |
| 16 KB | 7 | 79 | 5 | 84 |
| 16385-32767 bytes | 2 | 81 | 1 | 85 |
| 32, 64, 96, 128, 256 KB | 19 | 100 | 15 | 100 |

Figure 10:
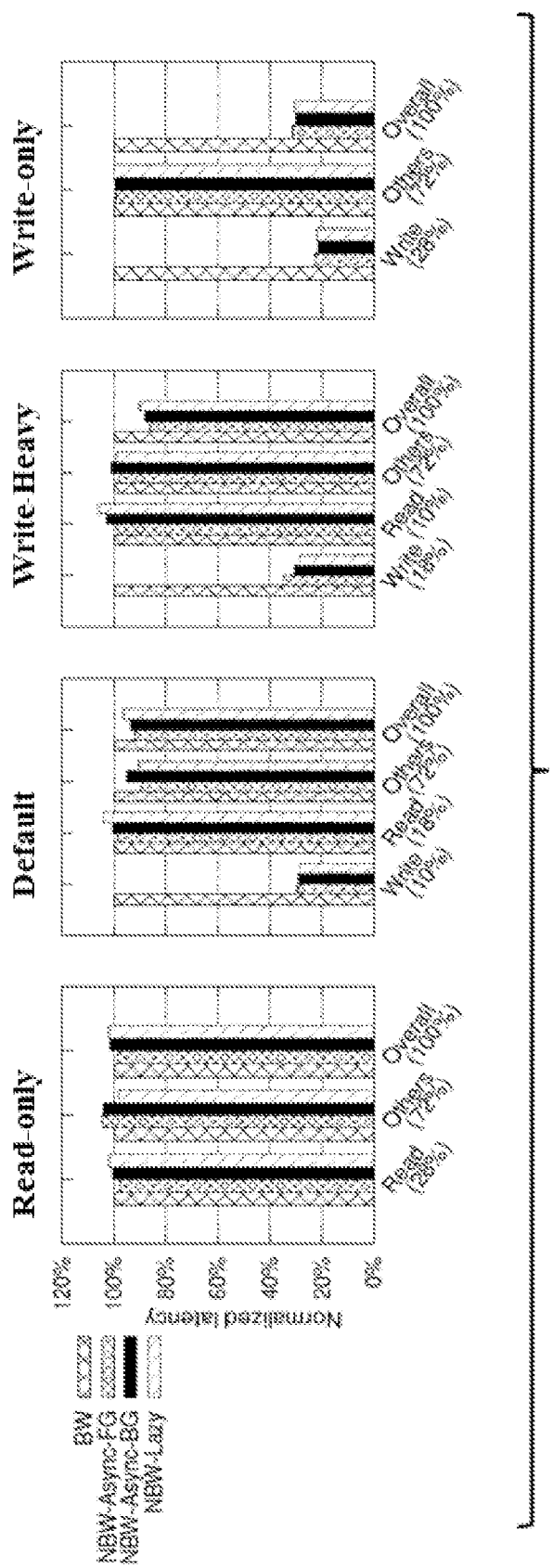
FIG. 10 presents the average operation latencies with the four solution variants normalized using the latency of traditional BW.

FIG. 10 presents the average operation latencies with the four solution variants normalized using the latency of traditional BW. Excluding the read-only workload, the dominant trend is that non-blocking writes modes offer significant reductions in write operation latency with little or no degradation in read latencies. Further, the average overall operation latency is proportional to the fraction of write misses and to the latency improvements for NFS write operations. For the three configurations containing write operations, the latency of the write operations is reduced between 65 and 79 percent when using the different modes of non-blocking writes.

Read latencies are slightly affected negatively due to additional blocking on certain pages. With BW, certain pages could have been fetched into memory by the time the read operation was issued. With non-blocking writes, the corresponding fetches could be delayed or not issued at all until the blocking read occurs. For the configuration with no write operations the average overall latency remained relatively unaffected.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] AMERICAN NATIONAL STANDARDS INSTITUTE. IEEE standard for information technology: Portable Operating System Interface (POSIX). Part 1, system application program interface (API)—amendment 1—realtime extension [C language]. IEEE, 1994. IEEE Std 1003.1b-1993 (formerly known as IEEE P1003.4; includes IEEE Std 1003.1-1990). Approved Sep. 15, 1993, IEEE Standards Board. Approved Apr. 14, 1994, American National Standards Institute.

[2] BACH, M. J. *The Design of the UNIX Operating System*, 1st ed. Prentice Hall Press, 1986.

[3] BHATTACHARYA, S., PRATT, S., PULAVARTY, B., AND MORGAN, J. Asynchronous I/O Support in Linux 2.5. In *Proc. of the Ottawa Linux Symposium* (July 2003).

[4] BSD. BSD System Calls Manual (aio write). http://www.unix.com/man-page/FreeBSD/2/aio_write/.

[5] BYAN, S., LENTINI, J., MADAN, A., PABON, L., CONDICT, M., KIMMEL., J., KLEIMAN, S., SMALL, C., AND STORER, M. Mercury: Hostside flash caching for the data center. In Proc. of IEEE MSST (April 2012).

[6] CHEN, F., KOUFATY, D. A., AND ZHANG, X. Hystor: making the best use of solid state drives in high performance storage systems. In *Proceedings of the International Conference on Supercomputing* (May-June 2011), ICS '11.

[7] DALEY, R. C., AND NEUMANN, P. G. A general purpose file system for secondary storage. In *Proceedings of the Fall Joint Computer Conference, Part I* (1965), AFIPS '65 (Fall, part I), pp. 213-229.

[8] ELMELEEGY, K., CHANDA, A., COX, A. L., AND ZWAENEPOEL, W. Lazy asynchronous I/O for event-driven servers. In Proceedings of the 2004 *USENIX Annual Technical Conference* (2004), ATC '04.

[9] EMC. VFCache. http://www.emc.com/storage/vfcache/vfcache.htm, 2012.

[10] FROST, C., MAMMARELLA, M., KOHLER, E., DE LOS REYES, A., HOVSEPIAN, S., MATSUOKA, A., AND ZHANG, L. Generalized file system dependencies. In *Proceedings of the ACM Symposium on Operating Systems Principles* (October 2007), SOSP '07, pp. 307-320.

[11] FUSION-IO. ioTurbine. http://www.fusionio.com/systems/ioturbine/, 2012.

[12] GUERRA, J., PUCHA, H., GLIDER, J., BELLUOMINI, W., AND RANGASWAMI, R. Cost effective storage using extent-based dynamic tiering. In *Proceedings of the USENIX Conference on File and Storage Technologies* (February 2011), FAST '11.

[13] HAGMANN, R. Reimplementing the Cedar file system using logging and group commit. In *Proceedings of the ACM Symposium on Operating Systems Principles* (November 1987), SOSP '87.

[14] HARTER, T., DRAGGA, C., VAUGHN, M., ARPACI-DUSSEAU, A. C., AND ARPACI-DUSSEAU, R. H. A file is not a file: understanding the i/o behavior of apple desktop applications. In *Proc. of the ACM Symposium on Operating Systems Principles* (October 2011).

[15] KGIL, T., AND MUDGE, T. FlashCache: a NAND flash memory file cache for low power web servers. In *Proceedings of the* 2006 *International Conference on Compilers, Architecture and Synthesis for Embedded Systems* (October 2006), CASES '06.

[16] KIM, H., AGRAWAL, N., AND UNGUREANU, C. Revisiting storage for smartphones. In *Proceedings of the USENIX Conference on File and Storage Technologies* (February 2012), FAST '12.

[17] KOLLER, R., MARMOL, L., RANGASWAMI, R., SUNDARARAMAN, S., TALAGALA, N., AND ZHAO, M. Write policies for host-side flash caches. In *Proceedings of the USENIX Conference on File and Storage Technologies* (February 2013), FAST '13.

[18] KROFT, D. Lockup-free instruction fetch/prefetch cache organization. In Proceedings of the 8th annual symposium on Computer Architecture (1981), ISCA '81, IEEE Computer Society Press, pp. 81-87.

[19] LI, S., CHEN, K., BROCKMAN, J. B., AND JOUPPI, N. P. Performance impacts of non-blocking caches in out-of-order processors. Tech. rep., Hewlett-Packard Labs and University of Notre Dame, July 2011.

[20] MCKUSICK, M. K., BOSTIC, K., KARELS, M. J., AND QUARTERMAN, J. S. *The Design and Implementation of the 4.4 BSD Operating System*. Addison Wesley, 1996, pp. 163, 196.

[21] NETAPP. Flash Accel. http://www.netapp.com/us/products/storagesystems/flash-accel/, 2013.

[22] NIGHTINGALE, E. B., CHEN, P. M., AND FLINN, J. Speculative execution in a distributed file system. *ACM Transactions on Computer Systems* (2006), 361-392.

[23] NIGHTINGALE, E. B., VEERARAGHAVAN, K., CHEN, P. M., AND FLINN, J. Rethink the sync. In *Proceedings of the 7th USENIX Conference on Operating Systems Design and Implementation* (November 2006), OSDI '06.

[24] *NIX DOCUMENTATION PROJECT. IRIX Man Pages (aio write). http://nixdoc.net/man-pages/IRIX/man3/aio_write.3.html.

[25] PRABHAKARAN, V., ARPACI-DUSSEAU, A. C., AND ARPACI-DUSSEAU, R. H. Analysis and evolution of journaling file systems. In Proceedings of the USENIX Annual Technical Conference (June 2005), ATC '05.

[26] RITCHIE, D. M., AND THOMPSON, K. The UNIX time-sharing system. *Commun. ACM* 17 (July 1974), 365-375.

[27] SAXENA, M., AND SWIFT, M. M. FlashVM: Revisiting the virtual memory hierarchy. In *Proceedings of the USENIX Annual Technical Conference* (June 2010), ATC '10.

[28] SHRIVER, E., SMALL, C., AND SMITH, K. A. Why does file system prefetching work? In *Proceedings of the USENIX Annual Technical Conference* (1999), ATC '99.

[29] SOARES, L., AND STUMM, M. FlexSC: Flexible system call scheduling with exception-less system calls. In *Proceedings of the 9th USENIX conference on Operating Systems Design and Implementation* (2010), OSDI'10, USENIX Association, pp. 1-8.

[30] SOURCE FORGE. Kernel Asynchronous I/O (AIO) Support for Linux. http://lse.sourceforge.net/io/aio.html.

[31] TANENBAUM, A. S. Modern Operating Systems, 3rd ed. Prentice Hall Press, Upper Saddle River, N.J., USA, 2007.

[32] USECHE, L., KOLLER, R., RANGASWAMI, R., AND VERMA, A. Truly non-blocking writes. In *Proceedings of the USENIX Workshop on Hot Topics in Storage and File Systems* (June 2011), Hot-Storage '11.

[33] VMWARE, INC. The Role of Memory in VMware ESX Server 3. http://www.vmware.com/pdf/esx3_memory.pdf.

[34] VMWARE, INC. VMware Virtual SAN. http://www.vmware.com/products/virtual-san/, 2013.

[35] WU, X., AND REDDY, A. L. N. Exploiting concurrency to improve latency and throughput in a hybrid storage system. *In Proceedings of the IEEE International Symposium in Modeling, Analysis and Simulation of Computer and Telecommunication Systems* (September 2010), MASCOTS '10.

What is claimed is:

1. A method for facilitating non-blocking writes in an operating system, the method comprising:
   in response to receiving, from a calling process, a write request comprising write data associated with a data page, determining whether the data page is loaded in cache memory, and when the data page is not loaded in the cache memory:
   creating, in a buffer memory, a patch including the write data;
   notifying the calling process that the request is complete; and
   in response to receiving a read request for a requested data page, determining whether one or more patches in the buffer memory construct the requested data page;
   blocking a reading process and, when all data being requested is contained in a patch queue of the buffer memory, unblocking the reading process and immediately performing the reading process;
   when the one or more patches fully construct the requested data page, applying the one or more patches to the requested data page to form an updated data page and placing the updated data page in the cache memory identified as the requested data page;
   when the one or more patches do not construct the requested data page, initiating an asynchronous fetch of the requested data page from a backing store, wherein the fetch is a background fetch or a lazy fetch, and, when the fetch is complete, applying to the requested data page any patches in the buffer memory associated with the requested data page; and
   providing the requested data page,
   the write request being received by an operating system (OS) component, which then performs the determining of whether the data page is loaded in the cache memory, and
   the read request being received by the OS component, which performs the determining of whether one or more patches in the buffer memory construct the requested data page.

2. The method of claim 1, further comprising, in response to receiving a durability request for a persisted data page:
   determining whether one or more patches in the buffer memory fully construct the persisted data page, and,
   when the one or more patches do not fully construct the persisted data page, fetching the persisted data page from the backing store, applying to the persisted data page any patches in the buffer memory associated with the persisted data page, and
   when the one or more patches fully construct the persisted data page in the durability request, applying the one or more patches to create the persisted data page in the cache memory; and
   marking the persisted data page for flushing to the backing store.

3. The method of claim 2, wherein the durability request originates from the calling process for a synchronous file write.

4. The method of claim 2, wherein the durability request originates from the operating system as a result of a periodic flushing of dirty pages to the backing store.

5. The method of claim 1, wherein the buffer memory comprises a plurality of first-in-first-out queues, wherein each first-in-first-out queue stores one or more patches associated with a specific data page,
   wherein creating the patch in the buffer memory further comprises inserting the patch into an associated first-in-first-out queue, and
   wherein applying the one or more patches to the requested data page comprises applying to the data page, in a first-in-first-out order, the one or more patches in the associated first-in-first-out queue.

6. The method of claim 5, wherein each first-in-first-out queue includes a single-holder lock mechanism, the method further comprising obtaining exclusive ownership of the single-holder lock mechanism for the associated first-in-first-out queue while inserting the patch into the associated first-in-first-out queue.

7. The method of claim 1, the method further comprising:
   marking the data page with an outdated state after the data page is fetched from the backing store; and
   marking the data page with an up-to-date state after applying to the data page patches stored in the buffer memory.

8. A system for facilitating non-blocking writes, the system comprising:
   one or more computer readable storage media comprising a cache memory, a buffer memory, and a backing store;
   a processing system;
   an operating system (OS) component; and
   program instructions stored on the one or more computer readable storage media that, when executed by the processing system, direct the processing system to:
   in response to receiving, from a calling process, a write request comprising write data associated with a data page, determining whether the data page is loaded in the cache memory, and when the data page is not loaded in the cache memory:
   creating, in the buffer memory, a patch including the write data;
   notifying the calling process that the request is complete; and
   in response to receiving a read request for a requested data page, determining whether one or more patches in the buffer memory construct the requested data page
   blocking a reading process and, when all data being requested is contained in a patch queue of the buffer memory, unblocking the reading process and immediately performing the reading process;
   when the one or more patches fully construct the requested data page, applying the one or more patches to the requested data page to form an updated data page and placing the updated data page in the cache memory identified as the requested data page;
   when the one or more patches do not construct the requested data page, initiating an asynchronous fetch of the requested data page from the backing store, wherein the fetch is a background fetch or a lazy fetch, and, when the fetch is complete, applying to the requested data page any patches in the buffer memory associated with the requested data page; and
   providing the requested data page,
   the write request being received by the OS component, which then performs the determining of whether the data page is loaded in the cache memory, and the read request being received by the OS component, which performs the determining of whether one or more patches in the buffer memory construct the requested data page.

9. The system of claim 8, further comprising, in response to receiving a durability request for a persisted data page:
   determining whether one or more patches in the buffer memory fully construct the persisted data page, and,
   when the one or more patches do not fully construct the persisted data page, fetching the persisted data page from the backing store, applying to the persisted data page any patches in the buffer memory associated with the persisted data page, and
   when the one or more patches fully construct the persisted data page in the durability request, applying the one or more patches to create the persisted data page in the cache memory; and
   marking the persisted data page for flushing to the backing store.

10. The system of claim 9, wherein the durability request originates from the calling process for a synchronous file write.

11. The system of claim 9, wherein the durability request originates from the OS component as a result of a periodic flushing of dirty pages to the backing store.

12. The system of claim 8, further comprising:
   in response to receiving an indication of a deleted file, discarding from the buffer memory any patches associated with data pages of the deleted file.

13. The system of claim 8, wherein patch size in the buffer memory is equivalent to data page size in the cache memory of the OS component.

14. The system of claim 8, wherein the buffer memory comprises a plurality of first-in-first-out queues, wherein each first-in-first-out queue stores one or more patches associated with a specific data page,
   wherein creating the patch in the buffer memory further comprises inserting the patch into an associated first-in-first-out queue, and
   wherein applying the one or more patches to the requested data page comprises applying to the data page, in a first-in-first-out order, the one or more patches in the associated first-in-first-out queue.

15. The system of claim 14, wherein each first-in-first-out queue includes a single-holder lock mechanism, the method further comprising obtaining exclusive ownership of the single-holder lock mechanism for the associated first-in-first-out queue while inserting the patch into the associated first-in-first-out queue.

16. A method for facilitating non-blocking writes in an operating system, the method comprising:
   receiving, from a calling process, a request comprising write data associated with a data page;
   determining whether the data page is loaded in cache memory, and when the data page is not loaded in the cache memory:
   initiating an asynchronous fetch of the data page from a backing store, wherein the fetch is a background fetch or a lazy fetch;
   creating, in a buffer memory, a patch including the write data;
   notifying the calling process that the request is complete;
   in response to receiving a notification that the asynchronous fetch of the data page from the backing store is completed, applying to the data page patches stored in the buffer memory; and
   blocking a reading process and, when all data being requested is contained in a patch queue of the buffer memory, unblocking the reading process and immediately performing the reading process;
   the request comprising write data being received by an operating system (OS) component, which then performs the determining of whether the data page is loaded in the cache memory.

17. The method of claim 16, wherein a background worker thread initiates the asynchronous fetch of the data page.

18. The method of claim 16, the method further comprising:
   marking the data page with an outdated state after the data page is fetched from the backing store; and
   marking the data page with an up-to-date state after applying to the data page patches stored in the buffer memory.

19. The method of claim 16, wherein the buffer memory comprises a plurality of first-in-first-out queues, wherein each first-in-first-out queue stores one or more patches associated with a specific data page,
   wherein creating the patch in the buffer memory further comprises inserting the patch into an associated first-in-first-out queue, and
   wherein applying patches to the data page comprises applying to the data page, in a first-in-first-out order, the one or more patches in the associated first-in-first-out queue.

20. The method of claim 19, wherein each first-in-first-out queue includes a single-holder lock mechanism, the method further comprising obtaining exclusive ownership of the single-holder lock mechanism for the associated first-in-first-out queue while inserting the patch into the associated first-in-first-out queue.

* * * * *